(12) United States Patent
Bugaets

(10) Patent No.: US 6,667,568 B1
(45) Date of Patent: Dec. 23, 2003

(54) IGNITION SYSTEM FOR AN INTERNAL COMBUSTION ENGINE

(76) Inventor: Evgeny S. Bugaets, Lomonosovsky, Prospect, dom. KV. 5, Moscow (RU), 117296

(*) Notice: Subject to any disclaimer, the term of this patent is extended or adjusted under 35 U.S.C. 154(b) by 0 days.

(21) Appl. No.: 10/110,542

(22) PCT Filed: Jul. 11, 2000

(86) PCT No.: PCT/RU00/00284
§ 371 (c)(1),
(2), (4) Date: Oct. 3, 2002

(87) PCT Pub. No.: WO01/28053
PCT Pub. Date: Apr. 19, 2001

(30) Foreign Application Priority Data
Oct. 14, 1999 (RU) .......................................... 99121401

(51) Int. Cl.[7] .......................... H01T 13/20; H01T 13/54
(52) U.S. Cl. ...................... 313/143; 313/141; 313/139
(58) Field of Search ................................ 313/141, 143, 313/138, 142, 139; 123/169 EL

(56) References Cited

U.S. PATENT DOCUMENTS 3,517,247 A * 6/1970 Szilagyi ..................... 313/141
4,082,980 A 4/1978 Sawada et al.
4,123,998 A * 11/1978 Heintzelman ............... 313/143
4,388,549 A * 6/1983 Bensman ..................... 313/143

FOREIGN PATENT DOCUMENTS

| DE | 661768 A | 6/1938 |
|----|----------|--------|
| RU | 2002347 C1 | 10/1993 |
| RU | 2118026 C1 | 8/1998 |
| SU | 1720115 | 3/1992 |

* cited by examiner

Primary Examiner—Ashok Patel
(74) Attorney, Agent, or Firm—McDermott, Will & Emery

(57) ABSTRACT

An ignition device for internal combustion engine including a spark plug containing a housing, an insulator having a central electrode and a sidewall electrode attached to the housing and forming a spark gap between the sidewall electrode and the end of the center electrode, where the space around the spark gap is covered with the internal conic surface of the housing expanding outwards, and a capacitive electric energy storage device attached to the spark plug, whereas the housing of the spark plug includes an attachment and a base part, whereas the attachment includes an internal conic surface expanding outwards and a slot for sidewall electrode.

2 Claims, 4 Drawing Sheets

IGNITION SYSTEM FOR AN INTERNAL COMBUSTION ENGINE

SCOPE

The present device relates to electrical engineering, especially to ignition devices for light composite fuels for internal combustion engines (ICE). It may be used with new ICE and with the old internal combustion engines that are already in operation.

PRIOR ART

Initiation of combustion of light composite fuels in the ICE is usually realised using a spark plug having an electric spark between the electrodes inserted into the combustion chamber formed at a given point in time due to high-voltage interelectrode sparkover.

Most spark plugs have the following components: housing, insulators and electrodes. The housing is usually equipped with screw thread for mounting the spark plug on the engine.

As a rule each ignition device accomplishes three tasks: the place, the method and the time of initiation of combustion. The time of initiation of combustion is not the subject of present invention.

Usually after fixing the spark plug in the engine the spark gap is located near the wall of the combustion chamber. The spark plugs of "open" design are widespread, where the spark gap is open to direct action of the fuel blend vortex. It is well known that the fuel blend vortex has a great speed especially near the combustion chamber wall. All this lead to two major drawbacks.

First, the ignition stability decreases. It is obvious at idling mode, at high gear it may cause ignition failure.

Second, the flame inside the combustion chamber spreads along the path of the said vortex. At first the flame spires to reach the central portion of the chamber, than it expands in a rather uniform way in all directions. The longer the spread path the higher is the sensitivity of the engine to the octane number. When accelerating the engine the torque prematurely decreases.

The fact of dissymmetry of combustion with respect to the centre causes a short-time thermodynamic unbalance of gas pressure on the piston bottom. The higher is the charge the stronger is the piston rotation around the point of support and it leads to short-term jams in the cylinder that causes the torque losses down to full stoppage of the internal combustion engine.

There are also the "closed" design spark plugs where the spark gap is closed from direct action of the fuel blend vortex.

Those spark plugs have a flare effect that helps to overcome the said disadvantages of the "open" design spark plugs.

However those spark plugs have different efficiency. For example the spark plugs that conform to the specifications (USSR Inventors Certificate No. 1778842, cl. H01 T 13/00, 1981 and Japanese Patent No. 6-283250, cl. H01 T 13/20, 1994) cannot deliver a noticeable flame because of the small volume of fuel charge.

Other spark plugs, e.g. U.S. Pat. No. 3,842,819, cl. 123/169, 1974 and U.S. Pat. No. 3,892,991, cl. 313/138, 1976, are too "closed" that worsen the fillability of the semi-isolated cavity with the fresh charge of fuel blend thus decreasing the ignition stability and the flame effect.

The Russian Federation Patent No. 2055432, cl. H01 T 13/54, 1996 describes the spark plugs having coaxial electrodes, where the spark is formed in a random location of the ring gap. Thus the flame becomes undesirably dissymetrical and its direction is random.

Now let us examine the method of burn initiation especially the nature of electric energy applied to the spark plug.

A classical ignition device uses a high-voltage ignition coil as a source of high-voltage electric energy. This coil stores the energy in the primary inductance. Such coils are rather bulky and heavy. They are known as "heavy coils".

The secondary high voltage is applied to the spark plug as a rule through a high-resistance circuit. After the high voltage sparkover of the spark gap the spark current is limited at a level of several dozens mA. Its duration is about 1 to 2 ms.

This rather slow method of application of electric energy decreases the ignition stability.

There is also a system where the ignition coil is mounted directly on the spark plug (German Patent No. 3915113). This design has some advantages. The coil is small because it does not store the energy; it is used as a high voltage pulse transformer. These coils are known as "light coils". Here the pulse duration may be shortened up to several microseconds and it is free from electric energy losses that occur in the high resistance connecting wires. This provides for high stability of ignition.

However this approach is very expensive to use in multicylinder internal combustion engine. Besides it is not enough reliable because the high voltage is badly compatible with high temperature in the coil.

The ignition device for internal combustion engine the most close to the present one is the device containing a spark plug with a housing where an electrical insulator, a central electrode and a housing electrode are placed, whereas the said electrodes form a spark gap and an electric energy storage device (U.S. Pat. No. 5,371,436).

This ignition device uses a capacitor as a capacitive storage that improves the ignition parameters.

The capacitor makes the ignition device independent from peculiarities of electric power source. Due to very low inductance and resistance of the capacitor and the spark plug the discharge of stored electric energy in the spark gap takes several dozens nanoseconds.

The increase of instantaneous power of the spark increases the ignition stability thus extending the mixture richness range. Besides, the electroerosion of spar plug electrodes.

This design has the following disadvantages:
  during the short electric discharge a lot of energy is spent for radiation and formation of shock wave. Experiments have shown that the spark heat efficiency in case of capacitor discharge through low inductance does not exceed 20%.
  the spark plug design does not allow the radiation energy and the shock wave to be of benefit for ignition because of dissipation inside the combustion chamber;
  negligible flame effect.

The spark plug the most close the essence of present device is the spark plug including a housing, an insulator with a central electrode and a sidewall electrode attached to the housing and forming a spark gap between the said sidewall electrode and the end of the central electrode, where the space around the spark gap is covered with the internal conic surface of the housing expanding outwards (USSR Inventors Certificate No. 1720115).

This device has a disadvantage of absorption of a lot of thermal energy that reduces its efficiency.

DISCLOSURE OF THE INVENTION

The task of the present design of ignition device for internal combustion engine is to obtain the maximal flame effect and to increase the efficiency of internal combustion engine.

The technical result is obtained due to new ignition device for internal combustion engine containing a spark plug that includes a housing, an insulator with a central electrode and a sidewall electrode attached to the housing and forming a spark gap between the said sidewall electrode and the end of the central electrode, where the space around the spark gap is covered with the internal conic surface of the housing expanding outwards, and a capacitive electric energy storage device attached to the said spark plug, whereas the housing of the spark plug includes an attachment and a base part, where the attachment has an internal conic surface expanding outwards and a slot for sidewall electrode, where the attachment is made of a substance having low thermal conductance and low catalytic parameters.

The device is also characterised by the vertex angle of the conic surface of the attachment that makes 40 to 60°.

BRIEF DESCRIPTION OF FIGURES

The essence of the present ignition device for internal combustion engine is illustrated by the following design descriptions and figures where.

THE BEST EMBODIMENT

Figure 1:
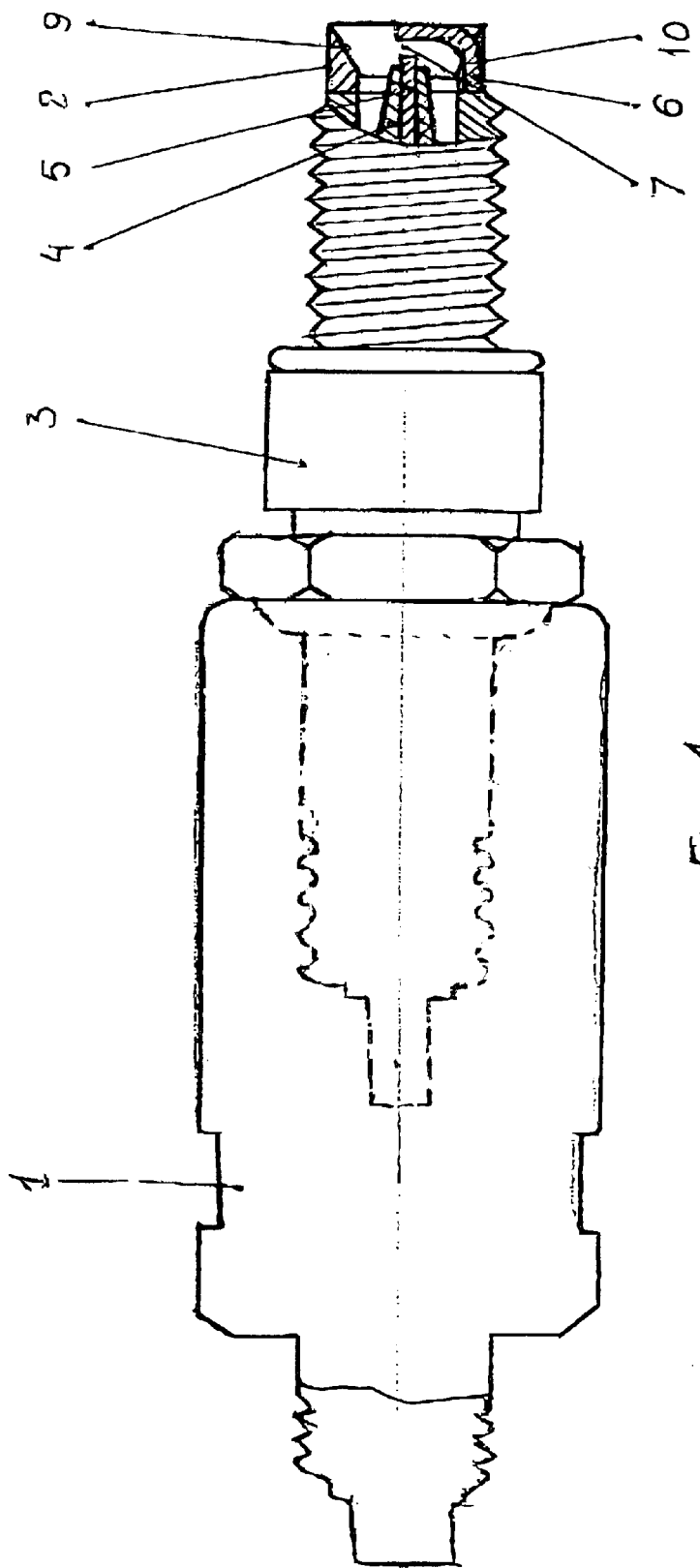
FIG. 1 is the ignition device for internal combustion engine according to the first example of realisation.

The ignition device for internal combustion engine containing a capacitive electric energy storage device 1, e.g. capacitor, attached to the spark plug, where the said spark contains a component housing made of attachment 2 and a base part 3, an insulator 4 having a central electrode 5 and a sidewall electrode 6 attached to the said base part 3 and forming a spark gap 7 between the said sidewall electrode and the end 8 of the central electrode 5.

The attachment 2 has an internal surface expanding outwards 9 and a slot 10 for sidewall electrode 6. The vertex angle α of the conic surface of the attachment makes 40 to 60°.

The attachment 2 is made of a substance having low thermal conductance and low catalytic parameters, e.g. Kovar or stainless steel.

This helps to reduce the thermal energy losses of the plasma ball after it expands to touch the conic surface of attachment.

The catalytic parameters of the said attachment substance prevent the occurrence of surface ignition.

The attachment 2 may have different modifications and the technique of bonding the said attachment to the base part 3 may be different.

For example the attachment 2 (FIG. 1) has a most simple design but for making a butt joint of the attachment 2 with the base part 3 a rather sophisticated welding procedure (contact welding or laser welding) is required.

Figure 2:
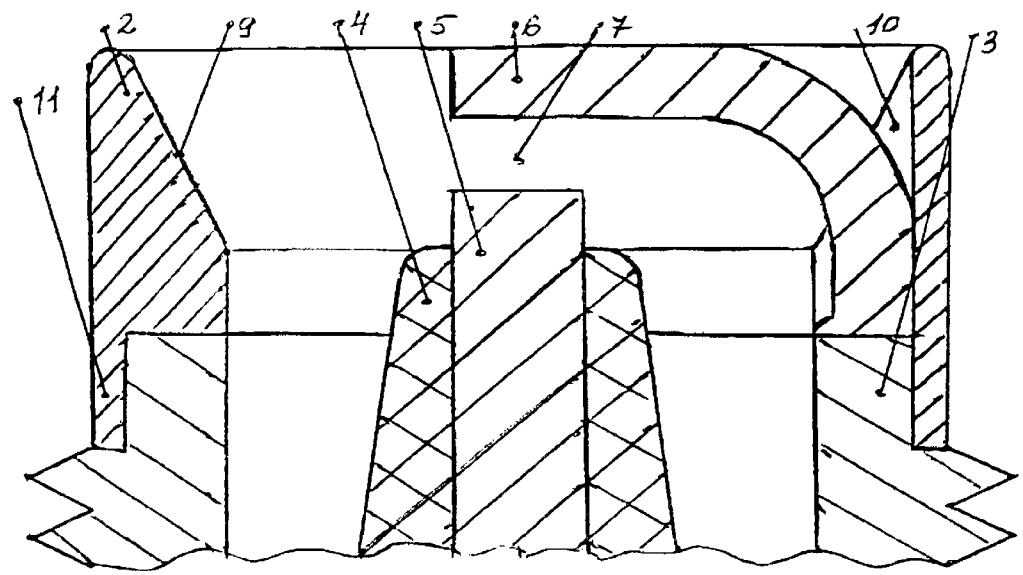
FIG. 2 is the ignition device for internal combustion engine according to the second example of realisation.

For example the attachment 2 (FIG. 2) has a more sophisticated design, it contains an annular ridge 11 having a cylindrical shape. Thus the attachment 2 may be bonded to the base part 3 using a more simple technique, e.g. spot welding or seam welding.

Figure 3:
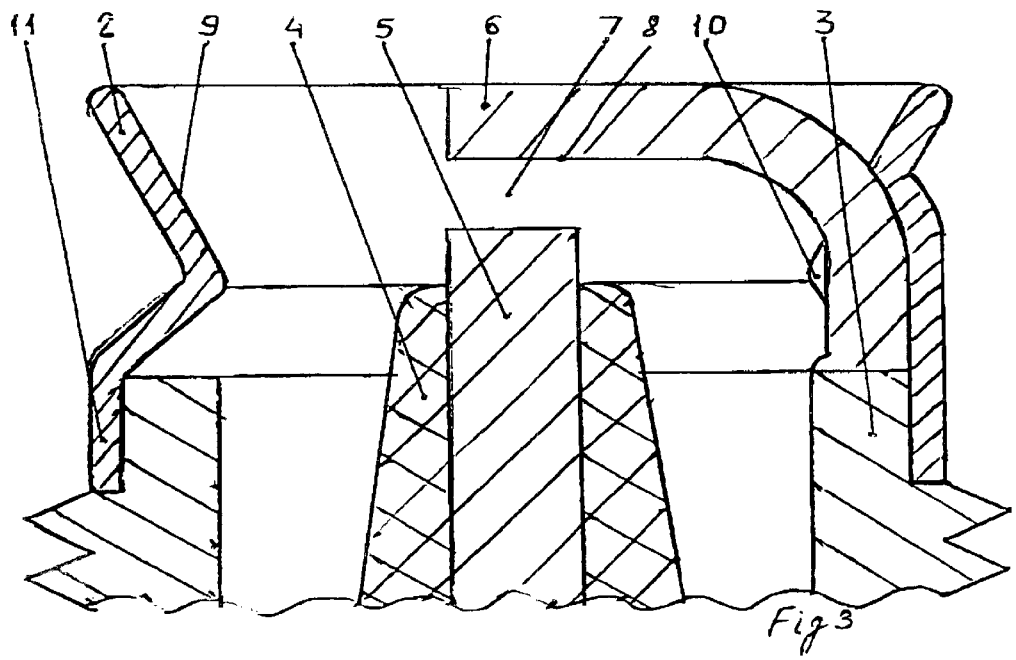
FIG. 3 is the ignition device for internal combustion engine according to the third example of realisation.
Figure 4:
FIG. 4 is the pattern of expansion of flame inside the combustion chamber when using an ignition system with an "open" spark plug.

For example the attachment 2 (FIG. 3) may be manufactured by appropriate deformation of a thin-walled cylindrical tube. This provides for great value of benefits at the stage of mass production.

Operation

The ignition device for internal combustion engine operates as follows:

The ignition device is mounted on an internal combustion engine. The high voltage wires of the said ignition device are connected to the capacitor 1. In this case the ignition point adjustment is not necessary. In the internal combustion engine there may be any number of spark plugs and of capacitors accordingly.

Here is the description of the ignition device:

During the time steps of intake and compression of an internal combustion engine the fuel blend fills the space inside the combustion chamber (not shown in the figure) including the spark gap zone 7.

When applying a high voltage on the ignition device the voltage at the central electrode 5 of the spark plug will rise with a delay caused by the capacitor 1 charging.

As a rule the value of spark gap 7 is chosen so as to obtain the sparkover after storing 30 to 70% of electric energy of the high voltage power source.

At the stage of sparkover of the spark gap 7 the capacitor 1 discharges. It is followed by recharge of the said capacitor wit its subsequent discharge and so on. The shape of the current pulse in the spark gap 7 resembles a damped radio-frequency pulse.

Taking into consideration the extremely low resistance of capacitor 1 and of central electrode 5 of the spark plug almost all the electric energy stored in capacitor 1 is liberated in the spark gap 7.

Most spark energy is spent for radiation and formation of shock wave however due to attachment 2 its useful result (preparation of fuel for combustion) remains. The fuel blend activated in the zone of spark gap 7 is not carried away by the fuel blend vortex.

Following the sparkover in the spark gap a spark channel is formed that turns into a plasma ball after the discharge current is over. The said plasma ball is well covered by the attachment 2 from the effect of fuel blend vortex. During several hundreds microseconds the plasma ball grows. After reaching 7 to 9 mm in diameter the plasma ball explodes.

Figure 5:
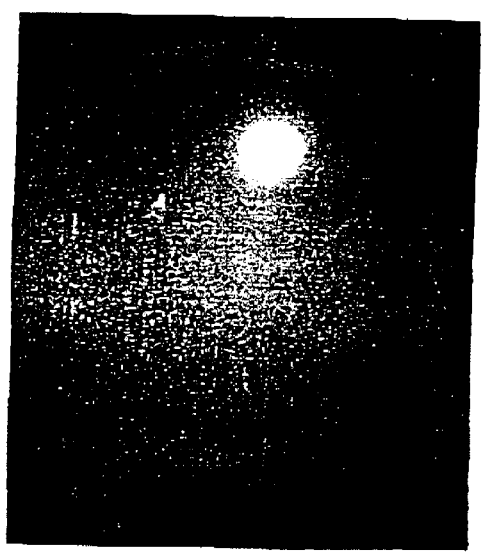
FIG. 5 is the pattern of expansion of flame inside the combustion chamber when using the ignition system of the present invention.

Due to internal conic surface 9 of the attachment 2 a bursting flame of significant length is formed (see FIG. 5). Thus the attachment 2 itself absorbs a small amount of thermal energy at all stages (radiation, shock wave, plasma ball and explosion).

Industrial Applicability

For determining the relationship between the flame length L and the vertex angle α of the conic surface of the attachment a special research was conducted.

Figure 6:
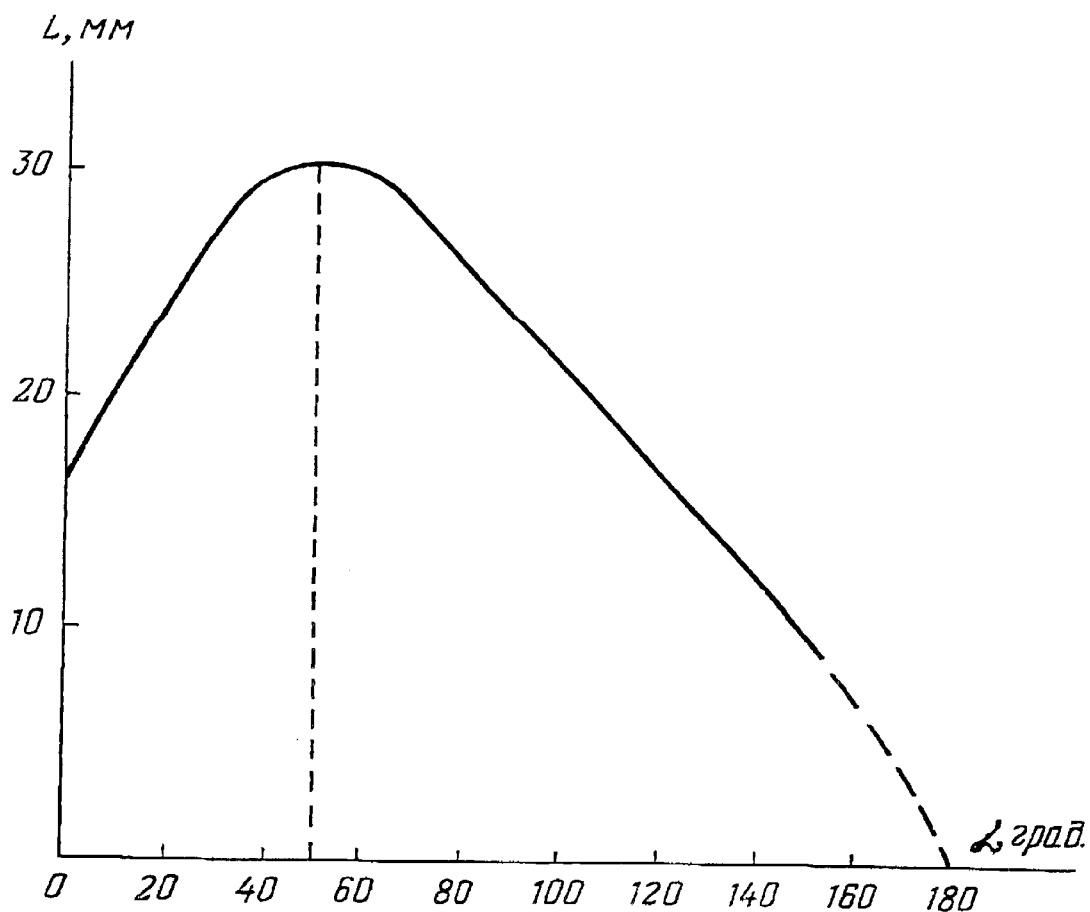
FIG. 6 is the flame length as a function of the vertex angle of the attachment cone.

The best results (L=30 mm) were obtained at α=40 to 60° (see FIG. 6).

It should be noted that due to effects of different types of energy, especially of the shock wave, on the internal surface of the attachment, the latter is always free from carbon deposit.

During the time steps of intake and compression the hot surface 9 of the attachment 2 and of the insulator 3 the spark plug is cooled down by the blend fuel with intensive vaporisation. This small-scale climate is favourable for increasing the ignition stability.

In the present ignition device for internal combustion engine the spark plug achieves a record-high flame length while maintaining high resource and stable ignition. The capacitor 1 amplifies the instantaneous power of the spark while the electromagnetic radiation rises insignificantly.

The high efficiency of the present device is proved by numerous tests using different types of internal combustion engines. The obtained results are as follows:

1. Due to blend fuel depletion the CO and CH content in the exhaust is sharply reduced when idling.
2. Due to reduction of blend fuel combustion in the combustion chamber the internal combustion engine is less sensitive to the octane number.
3. Due to rise of torque at high load and high speed of internal combustion engine the fuel consumption is reduced in by up to 20% city traffic and by 30% on a highway at a speed of 150 kilometer per hour.
4. The car dynamics and elasticity are significantly improved.

What is claimed is:

1. Ignition device for internal combustion engine including a spark plug containing a housing, an insulator having a central electrode (5) and a sidewall electrode (6) attached to the housing and forming a spark gap (7) between the said sidewall electrode and the end (8) of the central electrode (5) where the space around the spark gap is covered with the internal conic surface of the housing expanding outwards (9), and a capacitive electric energy storage device (1) attached to the said spark plug, whereas the housing of the spark plug includes an attachment (2) and a base part (3), where the attachment (2) has an internal conic surface expanding outwards (9) and a slot (10) for sidewall electrode (6), where the attachment (2) is made of a substance having low thermal conductance and low catalytic parameters.

2. Ignition device for internal combustion engine according to claim 1, wherein the vortex angle of the conic surface (9) of the attachment (2) makes 40 to 60°.

* * * * *